C. H. PERKINS.
ADJUSTABLE TEMPLE TIP.
APPLICATION FILED FEB. 9, 1915.
1,138,012.  Patented May 4, 1915.
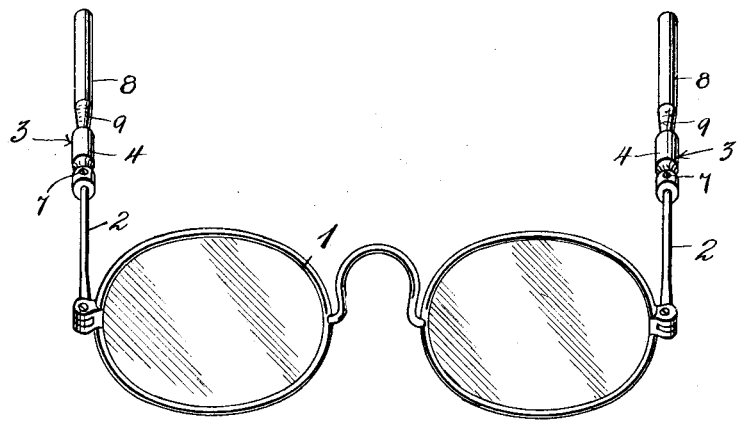
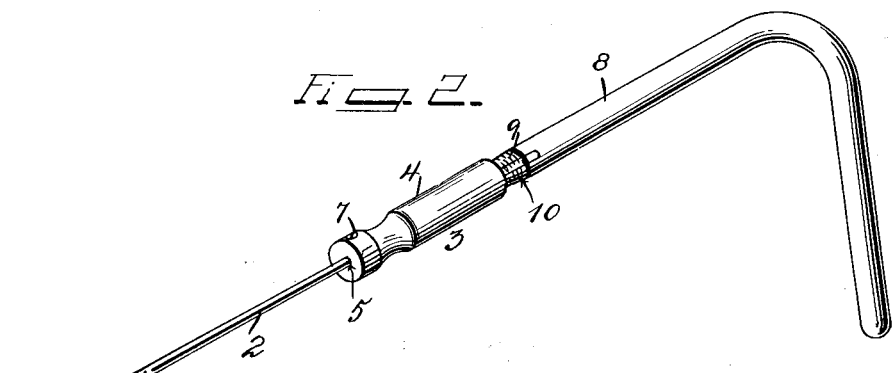
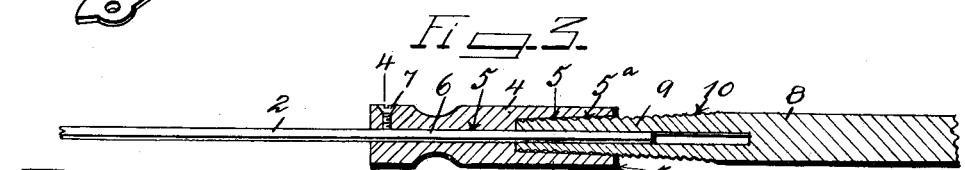
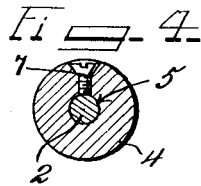 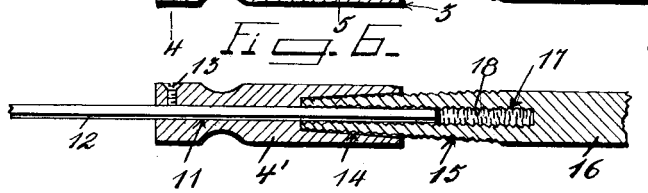
Witnesses
D. E. Stobel
H. B. Vrooman
Inventor
Charles H. Perkins
By E. E. Vrooman & Co.,
his Attorneys

UNITED STATES PATENT OFFICE.

CHARLES H. PERKINS, OF NORWICH, CONNECTICUT.

ADJUSTABLE TEMPLE-TIP.

1,138,012.　　　　　Specification of Letters Patent.　　　Patented May 4, 1915.

Application filed February 9, 1915. Serial No. 7,048.

*To all whom it may concern:*

Be it known that I, CHARLES H. PERKINS, a citizen of the United States of America, residing at Norwich, in the county of New London and State of Connecticut, have invented certain new and useful Improvements in Adjustable Temple-Tips, of which the following is a specification, reference being had therein to the accompanying drawing.

This invention relates to adjustable temples for eye glasses, spectacles and the like and has for its object the production of a simple and efficient device which may be applied to any temple bar without the necessity of specially constructing the temple bar in order to fit the adjustable tip thereof.

Another object of this invention is the production of a simple and efficient adjustable tip which may efficiently fit upon the temple bar and be held in an efficient adjustable position.

With these and other objects in view this invention consists of certain novel combinations, constructions, and arrangements of parts as will be hereinafter fully described and claimed.

In the accompanying drawing:—Figure 1 is a perspective view of a pair of glasses showing the adjustable temple tip attached to the temple bar. Fig. 2 is a perspective view of the temple bar carrying the tip. Fig. 3 is a longitudinal sectional view through a portion of the adjustable tip. Fig. 4 is a section taken on line 4—4, of Fig. 3. Fig. 5 is a section taken on line 5—5, of Fig. 3. Fig. 6 is a longitudinal section through an embodiment of the temple tip used in connection with the present invention.

By referring to the drawings it will be seen that 1 designates the frame of the glasses to which are secured the usual temple bars 2. In adjusting glasses or spectacles to a patient it has heretofore become necessary to bend the temple bars several times in order to make a correct fit. In order to obviate this difficulty a specially constructed tip 3 has been produced which is illustrated in Figs. 2 and 3. The tip 3 comprises a metallic socket 4 which is provided with a centrally located longitudinally extending aperture 5 into which the free end 6 of the temple bar is adapted to be adjustably fitted. A set screw 7 is carried by the outer end of the socket 4 and is adapted to firmly engage the temple bar 2 and hold the same in a locked position within the socket 4. It should be borne in mind that the set screw 7 has its outer end flush with the outer end of the socket 4 so as to prevent any protruding parts upon the temple bar or adjustable tip which would be likely to engage or become entangled with the hair of the wearer.

The socket member 4 is provided with a tapering pocket 5 in its rear end within which pocket is fitted a substantially L-shaped ear engaging member 8. This ear engaging member 8 is preferably formed of shell, zylonite, bone, ivory, or hollow metal, or any other suitable or desired material which may be found convenient for use. The ear engaging member or tip 8 tapers at one end as indicated at 9 and is roughened upon its outer face as indicated at 10 for the purpose of constituting an efficient gripping surface for gripping the side walls of the pocket 5ª formed in the socket member 4 and in this manner constitute an efficient friction gripping for holding the socket member 4 in engagement with the ear engaging member or tip 8.

It should be borne in mind that by having the adjustable ear engaging member or tip 3 formed as above described, a very efficient device has been produced which will allow the tip to be adjusted to any form of temple bar, and that the temple bar may be cut off with any suitable instrument, and have its free end positioned within the aperture 5 formed in the socket member 4, and in this manner allow the adjustable tip 3 to be set in any suitable or adjustable position relative to the temple bar 2 and to allow the device to be conveniently set to accommodate the wearer.

Of course, it should be understood that by use of the present device it will not be necessary to employ any specially constructed temple bar, as for instance, an old temple bar may be used which has had the ear piece thereof broken therefrom. It should be further understood that by means of the construction as set forth, the substantially L-shaped end 8 will at all times fit snugly against the head of the wearer around the rear of the ear and will not be positioned at a disagreeable angle which would be uncomfortable to the wearer.

In Fig. 6 there has been shown an embodiment of the invention, wherein the socket member 4' is provided with a longitudinally extending aperture 11 in which the temple bar 12 fits and is held therein by means of the set screw 13. The socket member 4' is provided with a tapering pocket 14 into which the roughened tapering end 15 of the ear engaging member 16 fits. This ear engaging member 16 is provided with a longitudinally extending aperture 17 which is roughened as indicated at 18 upon its inner face for engaging the rear end of the temple bar 12 and resisting any forward movement of the temple bar through the socket 18. It, of course, should be understood that these roughened portions formed upon the inner face of the socket 18 are merely adapted to retard and not resist the movement of the bar 12 within the socket 17.

It, of course, should be understood that where the term "eye glasses" is used in the accompanying claims, that this term is merely considered a broad term for any supporting device wherein glasses are supported in front of the eyes of a person, and it is intended to extend to spectacles and like articles.

Having thus described the invention what is claimed as new, is:

1. An adjustable temple tip comprising a socket member having a longitudinally extending aperture, a set screw carried at one end of said socket member and adapted to engage a temple bar adapted to be placed within said longitudinally extending aperture, said set screw being flush with the outer face of said socket member for preventing the engagement of said set screw with the hair of the wearer, said socket member provided with a tapering pocket at one end, a non-corrosible ear piece fitted within said pocket of said socket member, and said ear piece provided with a roughened tapering end engaging said pocket within said socket member for efficiently holding said socket member upon said ear piece.

2. A device of the class described comprising a socket member provided with a longitudinally extending aperture adapted to receive a temple bar of a pair of eye glasses, means for locking a temple bar within said aperture, said socket member provided with a tapering pocket formed in one end, an ear piece firmly held within said pocket, said ear piece provided with a longitudinally extending socket being roughened upon its inner face and adapted to engage the temple bar of a pair of eye glasses for resisting the longitudinal movement of the temple bar relative to said ear piece.

In testimony whereof I hereunto affix my signature in presence of two witnesses.

CHARLES H. PERKINS.

Witnesses:
ARCHS W. CORD,
JOSEPH A. RILEY.